(12) United States Patent
Wang

(10) Patent No.: US 6,367,756 B1
(45) Date of Patent: Apr. 9, 2002

(54) ADJUSTABLE DEVICE SUPPORT AND ANCHOR MEANS ARRANGEMENT

(76) Inventor: James Wang, 1F, No. 63, Alley 8, Lane 391, Sec. 3, Ho-Ping E. Rd., Taaipei (TW)

( * ) Notice: Subject to any disclaimer, the term of this patent is extended or adjusted under 35 U.S.C. 154(b) by 0 days.

(21) Appl. No.: 09/610,526

(22) Filed: Jul. 7, 2000

(51) Int. Cl.[7] .................................................. E04G 3/00
(52) U.S. Cl. .................................. 248/278.1; 248/276.1
(58) Field of Search ................................ 248/919, 921, 248/923, 917, 918, 278.1, 276.1, 415

(56) References Cited

U.S. PATENT DOCUMENTS

| | | | | |
|---|---|---|---|---|
| 4,768,744 A | * | 9/1988 | Leeds et al. | 248/280.1 |
| 5,092,552 A | * | 3/1992 | Dayton | 248/280.1 |
| 5,553,820 A | * | 9/1996 | Karten et al. | 248/286.1 |
| 5,713,549 A | * | 2/1998 | Shieh | 248/284.1 |
| 5,975,472 A | * | 11/1999 | Hung | 248/278.1 |
| 6,244,553 B1 | * | 6/2001 | Wang | 248/278.1 |

* cited by examiner

*Primary Examiner*—Anita King
*Assistant Examiner*—Gwendolyn Baxter
(74) *Attorney, Agent, or Firm*—Rosenberg, Klein & Lee

(57) ABSTRACT

An adjustable device support and anchor arrangement includes an anchor mounting, and an adjustable device support mounted on the anchor to support a device, wherein the adjustable device support includes a supporting base horizontally turned about the anchor and fixed at the desired angular position by a tightening up screw, a holder frame vertically adjustably pivoted to a supporting arm of the supporting base, a torsional spring mounted in a front opening of the supporting arm of the supporting base and stopped between the supporting arm and the holder frame to impart an upward pressure to the holder frame against the gravity of the holder frame and the load on the holder frame, and a device mount fixedly fastened to the holder frame to hold a device.

9 Claims, 9 Drawing Sheets

ADJUSTABLE DEVICE SUPPORT AND ANCHOR MEANS ARRANGEMENT

BACKGROUND OF THE INVENTION

The present invention relates to an adjustable device support and anchor means arrangement, which comprises an anchor means for mounting, and an adjustable device support mounted on the anchor means to hold a computer peripheral apparatus, enabling the computer peripheral apparatus to be adjusted horizontally as well as vertically to the desired angular position.

A regular device support for supporting a computer peripheral apparatus on the top of a table is generally comprised of a base, and a device mount mounted on the base to hold a computer peripheral apparatus, for example, a liquid crystal display. The device mount comprises a mounting shaft pivoted to the base. A lock is provided to lock the device mount. A flexible friction pad is mounted on the mounting shaft of the device mount for positive positioning in the base. When adjusting the angular position of the device supported on the device mount, the lock is unlocked, and then the device mount is held in the hand and turned to the desired angular position, and then the lock is locked again. This design is not satisfactory in function. When adjusting the angular position of the device mount, the user must support the device mount and the device supported on the device mount with one hand, and unlock the lock with the other hand. If the device mount is not well supported when unlocking the lock, the device mount may fall suddenly, causing the supported device to be damaged. Further, the flexible friction pad wears quickly with use. When the flexible friction pad starts to wear, the device mount may easily be forced out of position.

SUMMARY OF THE INVENTION

The present invention has been accomplished to provide an adjustable device support and anchor means arrangement, which eliminates the aforesaid problems. According to one aspect of the present invention, the adjustable device support and anchor means arrangement comprises an adjustable device support adapted to hold a computer peripheral apparatus, and an anchor means adapted to support the adjustable device support on the top of a table or a flat wall. According to another aspect of the present invention, the adjustable device support comprises a supporting base horizontally turned about the anchor means and fixed at the desired angular position by a tightening up screw, a holder frame vertically adjustably pivoted to a supporting arm of the supporting base, a torsional spring mounted in a front opening of the supporting arm of the supporting base and stopped between the supporting arm and the holder frame to impart an upward pressure to the holder frame against the gravity of the holder frame and the load on the holder frame, and a device mount fixedly fastened to the holder frame to hold a device.

DETAILED DESCRIPTION OF THE PREFERRED EMBODIMENT

Figure 1:
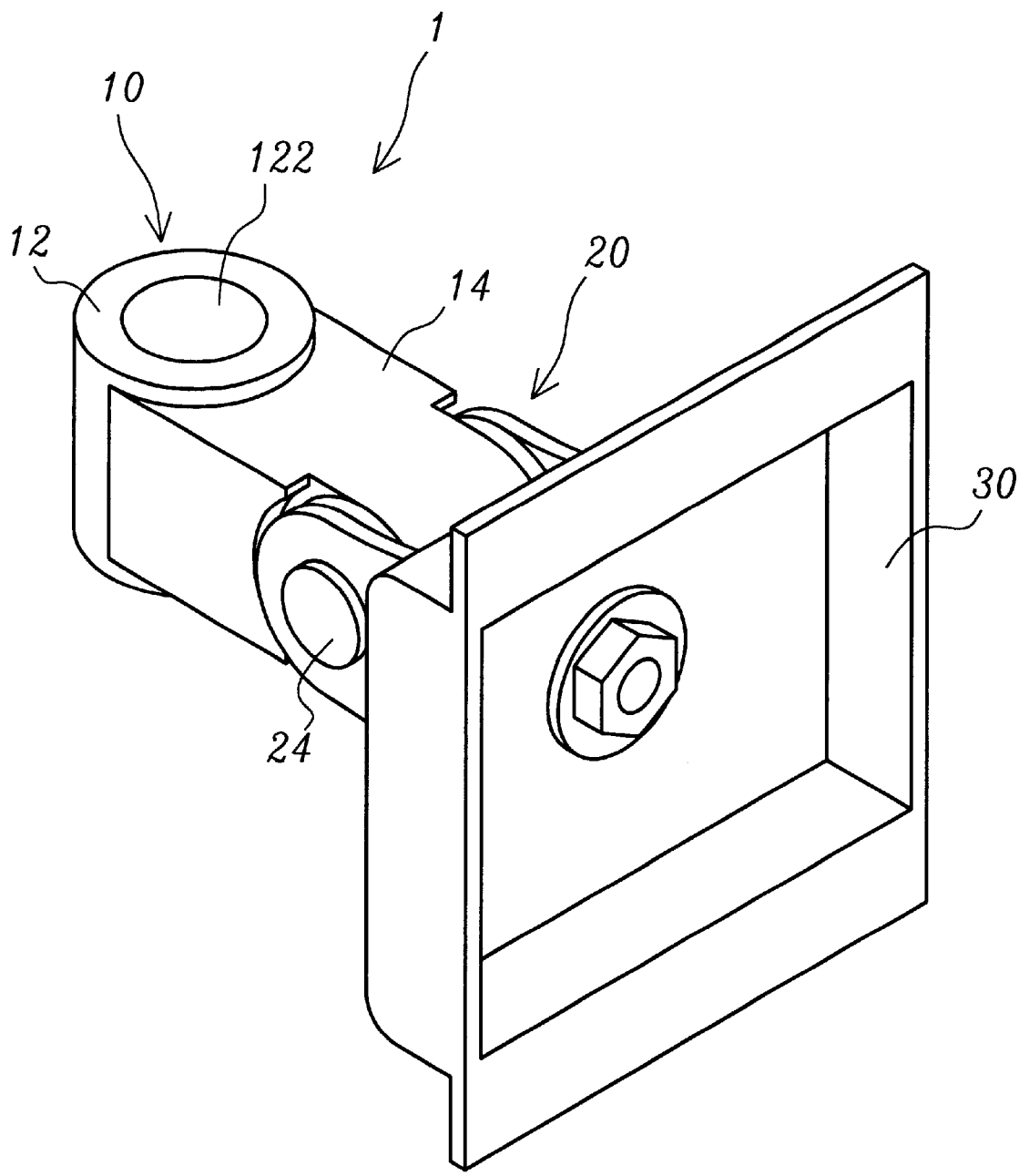
FIG. 1 is an elevational view of an adjustable device support according to the present invention.
Figure 2:
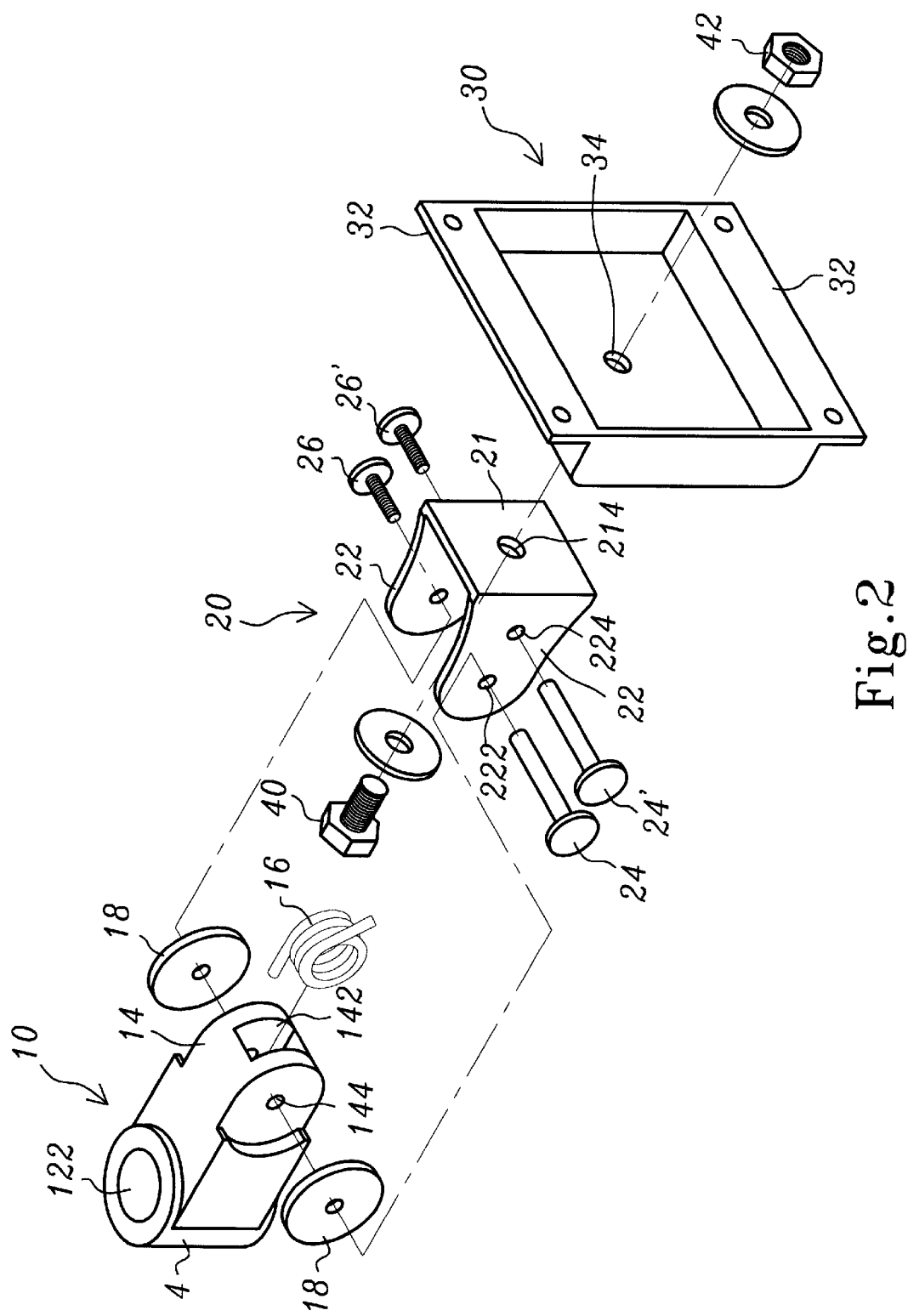
FIG. 2 is an exploded view of the adjustable device support shown in FIG. 1.

Referring to FIGS. 1 and 2, an adjustable device support 1 is shown comprising a supporting base 10, a holder frame 20, and a device mount 30. The supporting base 10 comprises a tubular mounting shaft 12 defining an axial mounting through hole 122, a supporting arm 14 perpendicularly formed integral with the periphery of the tubular mounting shaft 12, and a torsional spring 16 mounted in a front opening 142 of the supporting arm 14. The supporting arm 14 comprises two mounting holes 144 aligned at two opposite sides of the front opening 142. The holder frame 20 is a substantially U-shaped frame pivoted to the supporting arm 14 of the supporting base 10, comprising a flat bearing wall 21, and two side walls 22 perpendicularly backwardly extended from two lateral sides of the flat bearing wall 21. The side walls 22 each have a first axle hole 222 respectively fastened to the mounting holes 144 of the supporting arm 14 by a screw 26 and a screw cap 24, a second axle hole 224 mounted with another screw 26' and screw cap 24'. Further, two flexible gaskets 18 are respectively mounted on the screw 26 and the screw cap 24 and retained between two opposite lateral side walls of the supporting arm 14 and the side walls 22 of the holder frame 20. The torsional spring 16 is suspended in the front opening 142 of the supporting arm 14 around the screw cap 24, having one end stopped at an inside wall of the supporting arm 14 and an opposite end stopped at a part of the screw cap 24'. Alternatively, the screw 26' and screw cap 24' may be eliminated, and fixed stop means, for example, a protruded portion 28 is provided at one side wall 22 for the positioning of one end of the torsional spring 16 (see FIG. 3). The bearing wall 21 comprises a center mounting hole 214. The device mount 30 is fixedly fastened to the bearing wall 21 of the holder frame 20, comprising a center mounting hole 34 fastened to the center mounting hole 214 of the bearing wall 21 of the holder frame 20 by a screw bolt 40 and a nut 42, and two mounting flanges 32 extended from two opposite sides thereof and adapted for fastening to the back wall of a liquid crystal display module or any of a variety of computer peripheral apparatus.

Figure 3:
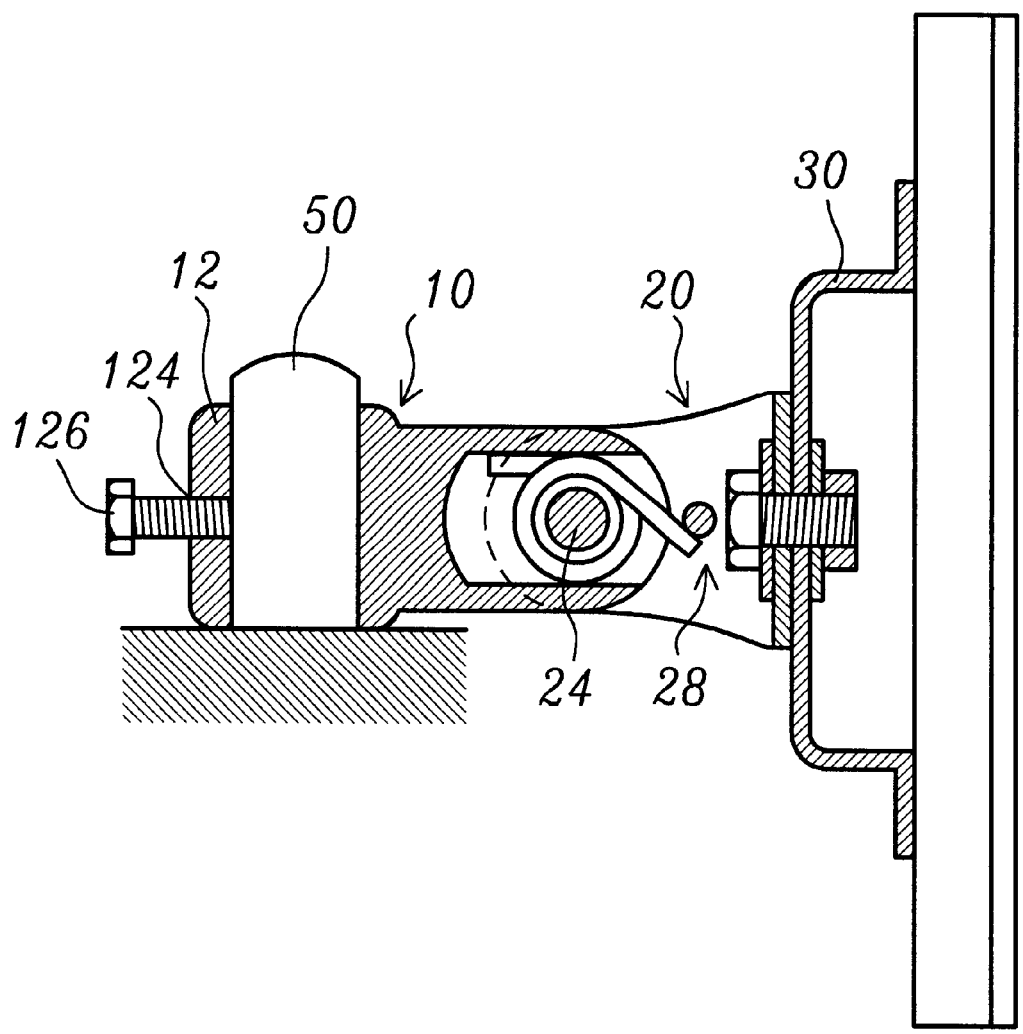
FIG. 3 is a side view in section of the present invention, showing the adjustable device support installed in a post, and a device installed in the device mount.

Referring to FIG. 3, the mounting shaft 12 of the supporting base 10 is coupled to a fixed post 50, and a tightening up screw 126 is threaded into a radial screw hole 124 on the mounting shaft 12 and stopped against the periphery of the fixed post 50 to secure the supporting base 10 to the fixed post 50. When loosening the tightened up screw 126, the supporting base 10 can be turned horizontally about the fixed post 50 to the desired angle.

Figure 4:
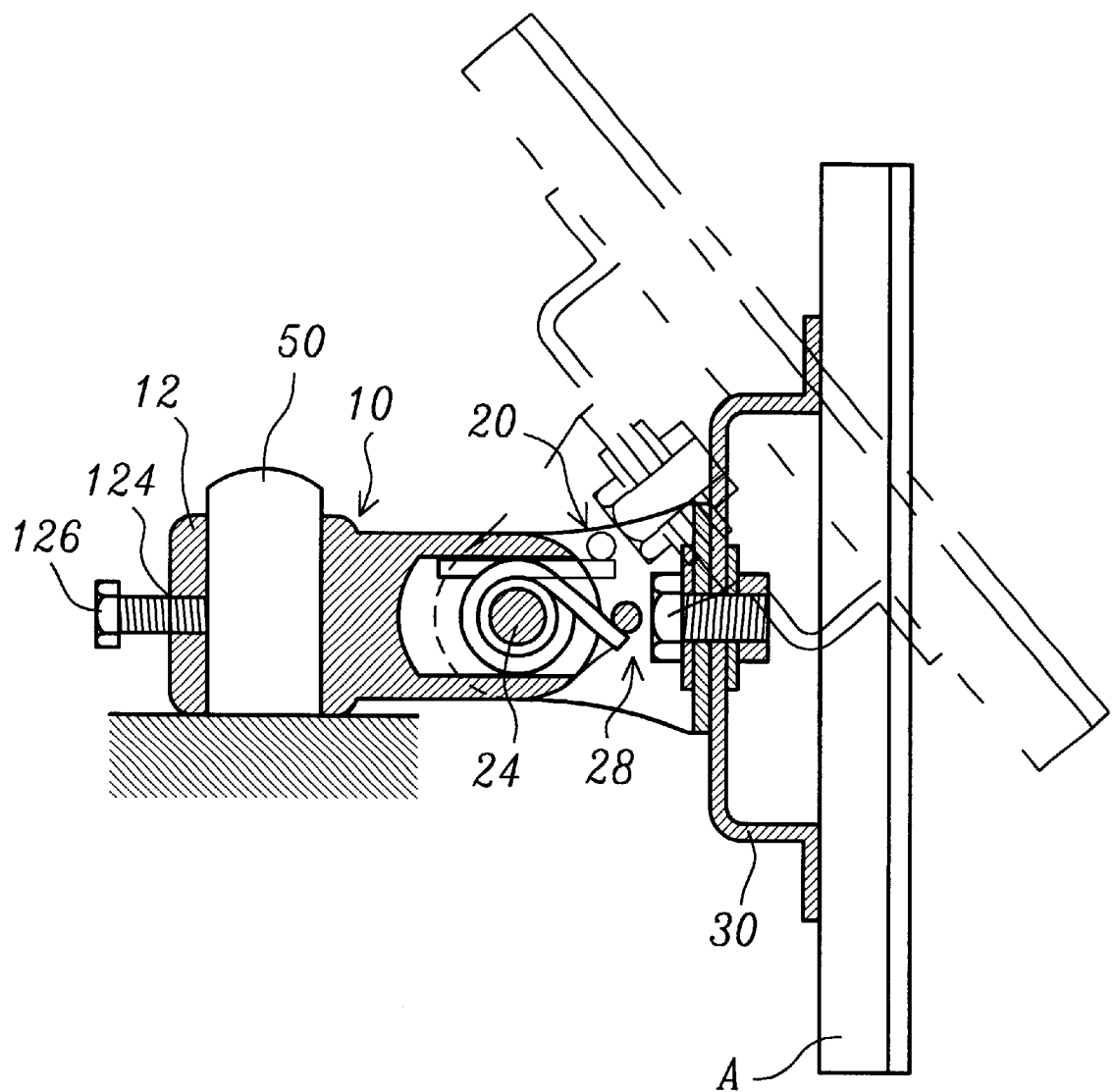
FIG. 4 is a schematic drawing showing the angular position of the supported device, the device mount and the holder frame adjusted relative to the supporting base according to the present invention.

Referring to FIG. 4 and FIG. 3 again, the supported device A with the device mount 30 and the holder frame 20 can be adjusted vertically to the desired angle relative to the supporting arm 14 of the supporting base 10. After each adjustment, the torsional spring 16 imparts a pressure to the holder frame 20 to support the holder frame 20, the device mount 30 and the supported device A in position. Because the torsional spring 16 has one end stopped at an inside wall of the supporting arm 14 and an opposite end stopped at the protruded portion 28 (or a part of the screw cap 24' shown in FIG. 2), the torsional spring 16 is forced to reserve energy when turning the supported device A, the device mount 30 and the holder frame 20 downwards relative to the supporting arm 14. When adjusting the holder frame 20 upwards relative to the supporting arm 14, the torsional spring 16 releases the energy. By means of the aforesaid arrangement, the supported device A can be adjusted horizontally as well as vertically to the desired angular position.

Figure 5:
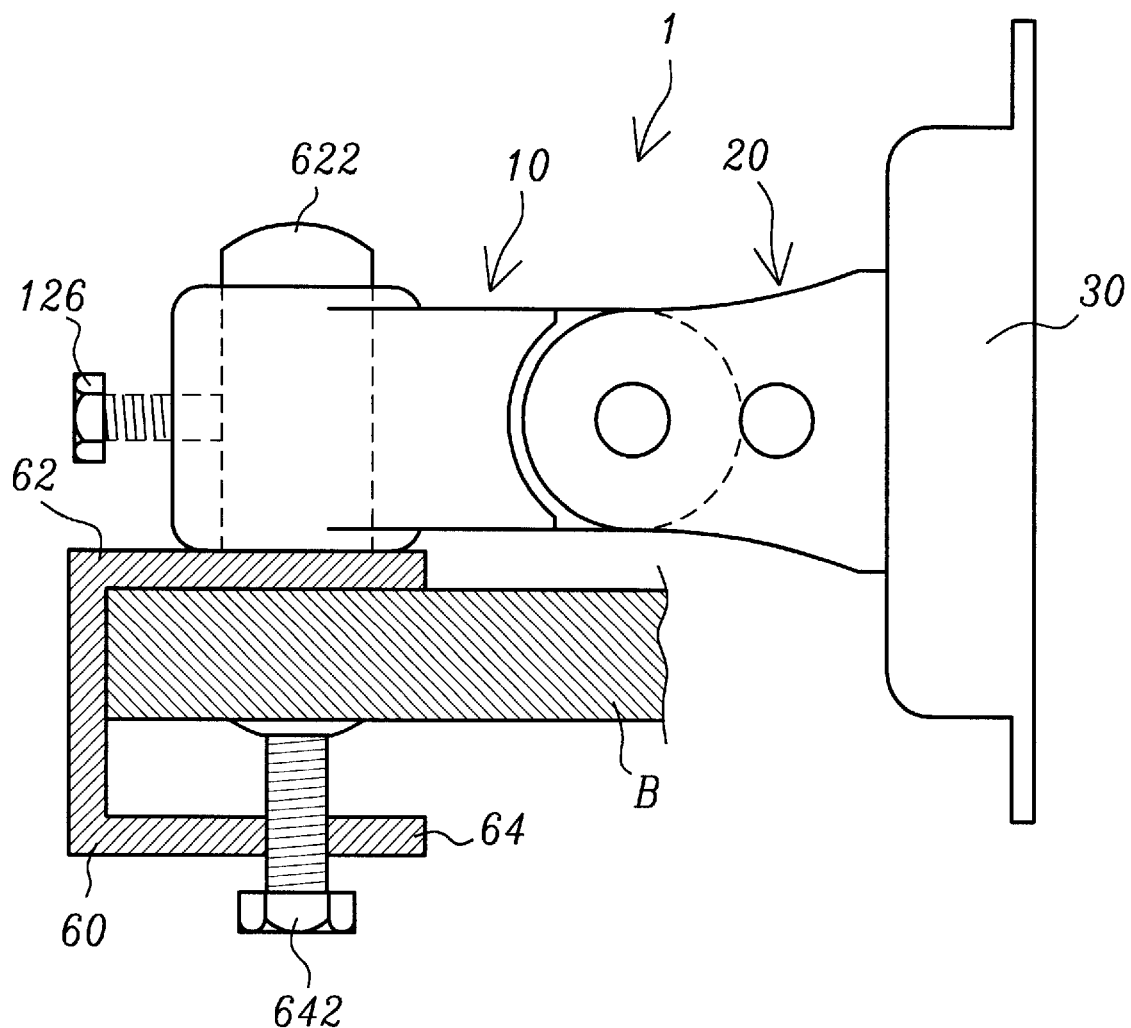
FIG. 5 illustrates the adjustable device support used with a mounting assembly and mounted on the top of a table according to the present invention.

Referring to FIG. 5, the adjustable device support 1 may be used with a mounting assembly for mounting on a flat board, for example, the top B of a table. The mounting assembly comprises a substantially U-shaped mounting frame 60 attached to the top B of a table at one side, a post 622 raised from the top wall 62 of the mounting frame 60 and adapted to hold the supporting base 10, and a tension clamp 642 mounted on the bottom wall 64 of the mounting frame 60 and fastened tight to fix the mounting frame 60 to the top B of the table.

Figure 6:
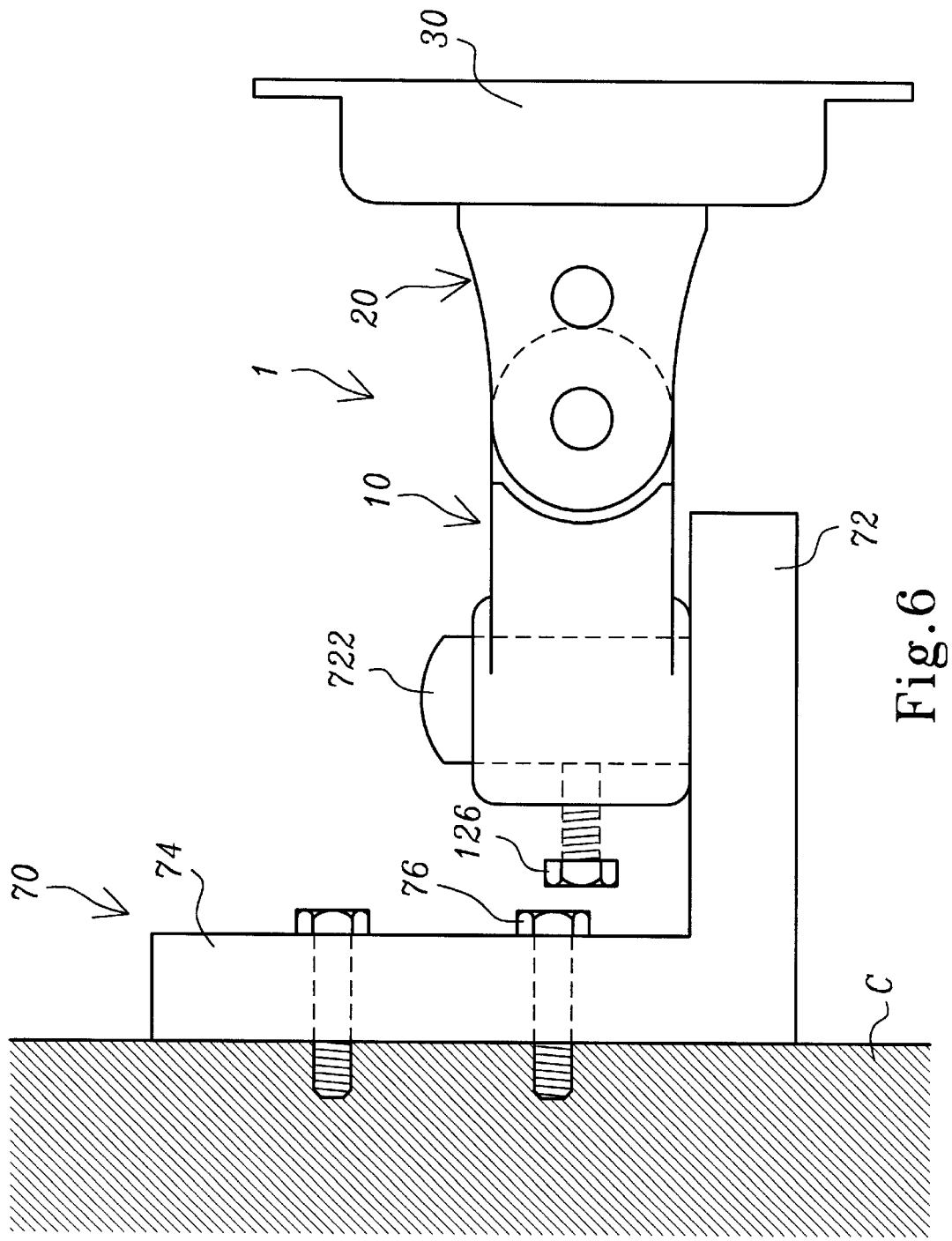
FIG. 6 illustrates the adjustable device support used with a L-shaped mounting frame and mounted on a wall according to the present invention.

Referring to FIG. 6, the adjustable device support 1 may be used with a substantially L-shaped mounting frame 70. The mounting frame 70 comprises a vertical wall 74 fixedly fastened to a flat wall C by screw nails 76, a horizontal wall 72 perpendicularly extended from the bottom side of the vertical wall 74, a fixed post 722 raised from the horizontal wall 72 and adapted to hold the supporting base 10 of the adjustable device support 1.

Figure 7:
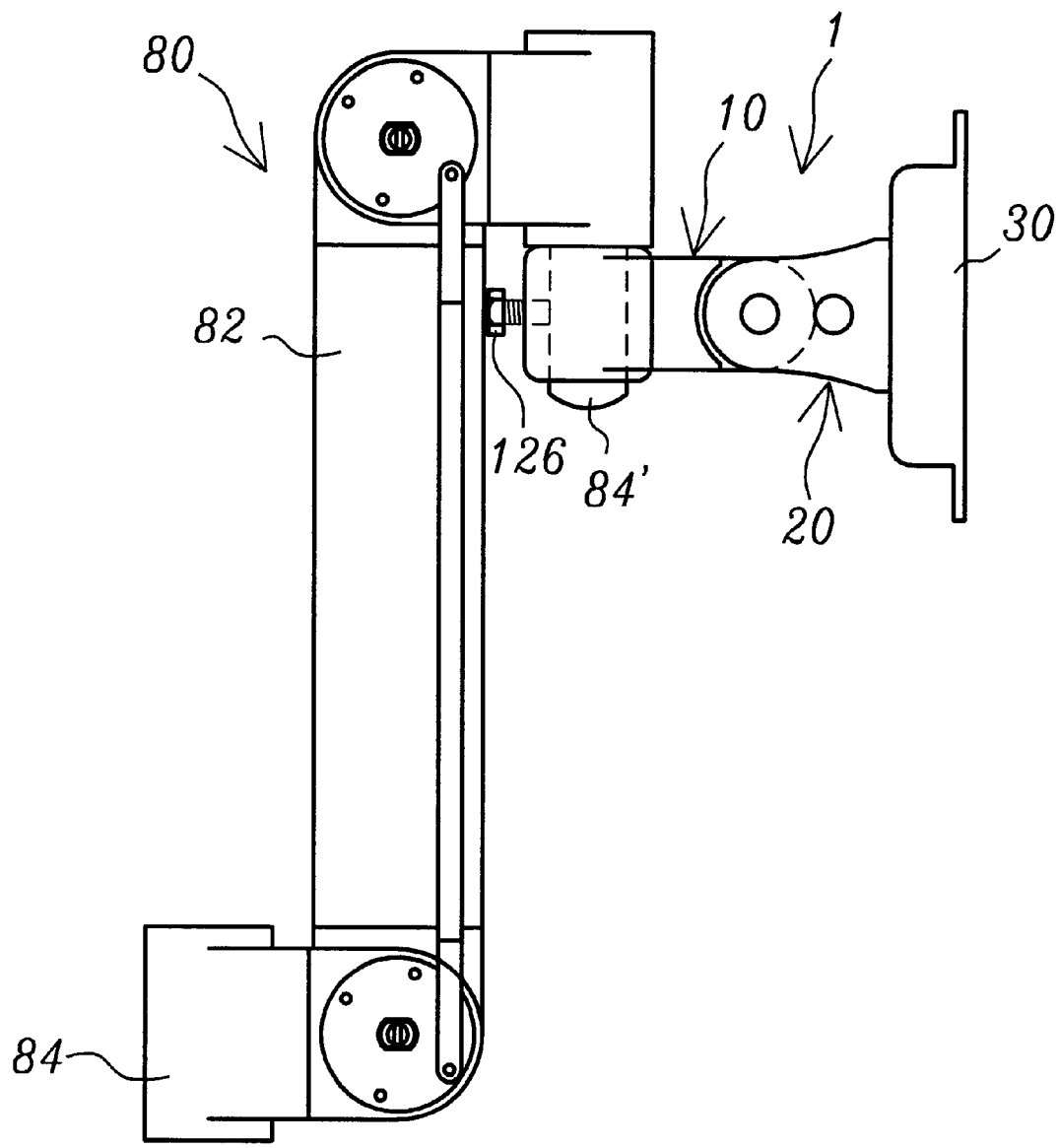
FIG. 7 illustrates the adjustable device support used with an adjustable bracket according to the present invention.

Referring to FIG. 7, the adjustable device support 1 may be used with an adjustable bracket 80. The adjustable bracket 80 comprises a bottom mounting arm 84 adapted for use with the mounting assembly shown in FIG. 5 for mounting on, for example, the top of a table, and a top mounting arm 84' adapted for holding (the supporting base 10 of) the adjustable device support 1.

Figure 8:
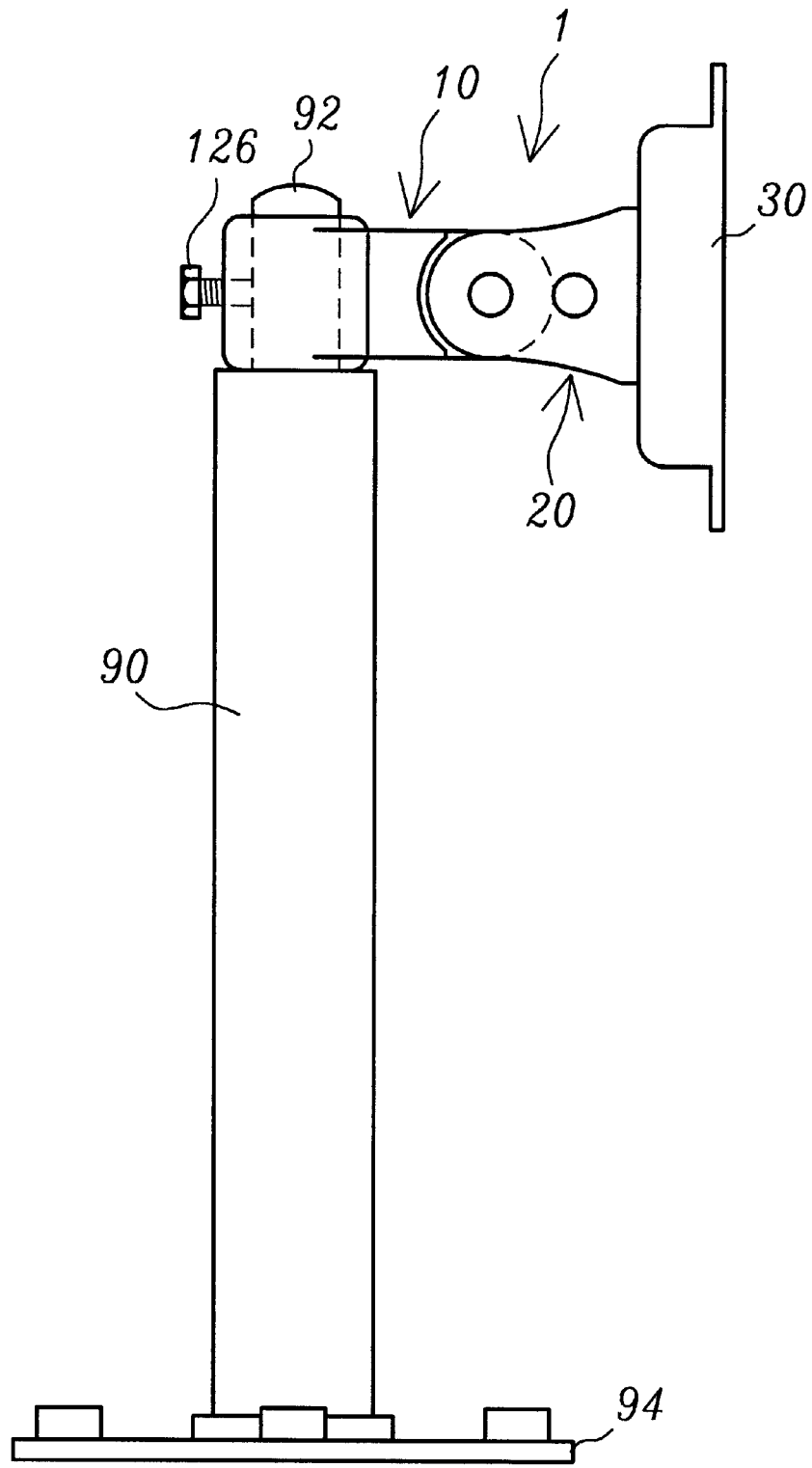
FIG. 8 illustrates the adjustable device support used with a stand according to the present invention.

Referring to FIG. 8, the adjustable device support 1 may be used with a stand 90. The stand 90 comprises a bottom plate 94 adapted for fastening to the top of a table or the ground by screws, and a top post 92 adapted for holding the supporting base 10 of the adjustable device support 1.

Figure 9:
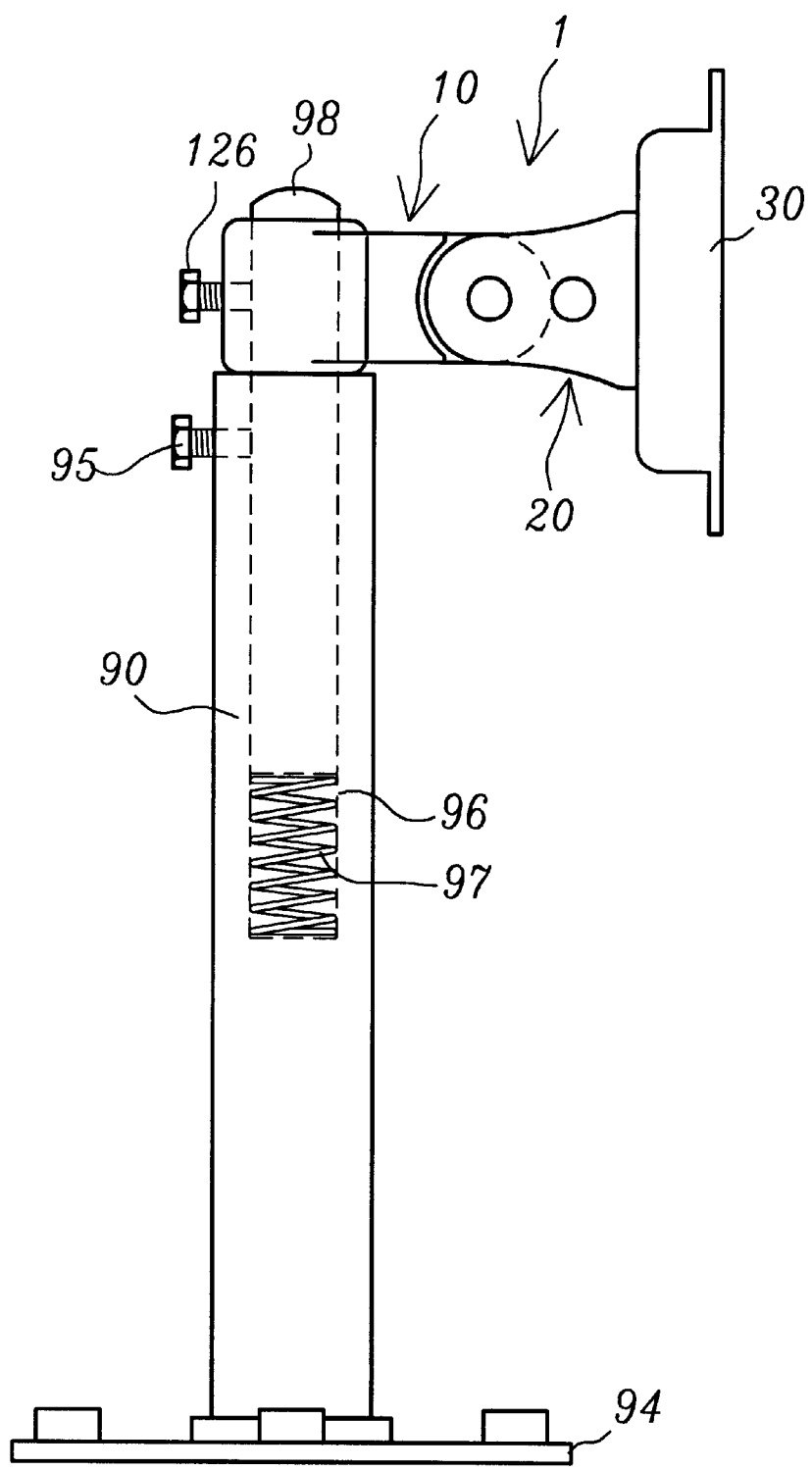
FIG. 9 illustrates th e adjustable device support use d with an elevation-adjustable stand according to the present invention.

In FIG. 8, the top post 92 is fixedly provided at the top side of the stand 90. Alternatively, the top post 98 may be made vertically adjustable as shown in FIG. 9. In FIG. 9, the top post 98 is supported on a compression spring 97 in an axial hole 96 in the stand 90, and a tightening up screw 95 is mounted in a radial screw hole (not shown) on the stand 90 to fix the top post 98 at the desired elevation. When loosening, the tightening up screw 95, the compression spring 97 immediately pushes the top post 98 upwards. After the top post 98 has been moved to the desired elevation in the stand 90, the tightening up screw 95 is fastened up to fix the top post 98 at the desired elevation.

It is to be understood that the drawings are designed for purposes of illustration only, and are not intended for use as a definition of the limits and scope of the invention disclosed.

What the invention claimed is:

1. An adjustable device support and anchor means arrangement comprising anchor means, and an adjustable device support mounted on said anchor means to support a device, said adjustable device support comprising:

a supporting base mounted on said anchor means, said supporting base comprising a mounting shaft coupled to said anchor means, and a supporting arm perpendicularly extended from the periphery of said mounting shaft, said supporting arm comprising a front opening, and two mounting holes aligned at two opposite sides of said front opening:

a holder frame pivoted to said supporting arm of said supporting base, said holder frame comprising a flat bearing wall, and two side walls perpendicularly backwardly extended from two lateral sides of said flat bearing wall, the side walls of said holder frame each having axle hole respectively pivoted to the mounting holes of said supporting arm by a screw and a screw cap:

a spring member mounted in the front opening of said supporting arm to impart an upward pressure to said holder frame against gravity assist of said holder frame, said spring member being a torsional spring mounted on said screw and said screw cap at said holder frame in said front opening of said supporting arm and having one end adjacent an inside wall of said supporting arm and on opposing end adjacent a stop means at said holder frame;

two flexible gaskets respectively mounted on the screw and screw cap at said holder frame and retained between two opposite lateral side walls of said supporting arm and the side walls of said holder frame; and a device mount fixedly fastened to the bearing wall of said holder frame to hold a device.

2. The adjustable device support and anchor means arrangement of claim 1 wherein said stop means comprises a protruded portion raised from one side wall of said holder frame for positioning of one end of said torsional spring.

3. The adjustable device support and anchor means arrangement of claim 1 wherein said stop means comprises two axle holes respectively disposed at the two side walls of said holder frame, the screw and the screw cap respectively mounted in the axle holes of said stop means and fastened to each other for the positioning of said torsional spring.

4. The adjustable device support and anchor means arrangement of claim 1 wherein said device mount comprises two mounting flanges respectively extended from two opposite sides thereof and adapted for fastening to a back wall of the device to be supported on said device mount.

5. The adjustable device support and anchor means arrangement of claim 1 wherein said bearing wall of said holder frame comprises a center mounting hole, and said device mount comprises a center mounting hole fastened to the center mounting hole on said bearing wall of said holder frame by a screw bolt and a nut.

6. The adjustable device support and anchor means arrangement of claim 1 wherein said anchor means comprises a U-shaped mounting frame adapted for attaching to a flat board, a post raised from a top wall of said mounting frame and adapted to hold the mounting shaft of said supporting base of said adjustable device support, and a tension clamp mounted on a bottom wall of said mounting frame and adapted to fix said mounting frame to the flat board to which said mounting frame is attached.

7. The adjustable device support and anchor means arrangement of claim 1 wherein said anchor means comprises a substantially L-shaped mounting frame, said mounting frame comprising a vertical wall fixedly fastened to a flat wall by screw nails, a horizontal wall perpendicularly extended from a bottom side of said vertical wall, and a fixed post raised from said horizontal wall and adapted to hold the mounting shaft of said supporting base of said adjustable device support.

8. The adjustable device support and anchor means arrangement of claim 1 wherein said anchor means comprises a stand, said stand comprising a bottom plate adapted for fastening to the top of a table or a ground surface by screws, and a top post adapted for holding the mounting shaft of said supporting base of said adjustable device support.

9. The adjustable device support and anchor means arrangement of claim 1 wherein said anchor means comprises a stand, said stand comprising a bottom plate adapted for fastening to the top of a table or a ground surface by screws, an axial hole extended to a top end thereof, a compression spring mounted inside said axle hole, a top post axially movably mounted in said axial hole and supported on said compression spring and adapted for holding the mounting shaft of said supporting base to said adjustable device support, and a tightening up screw mounted on said stand and adapted to fix said top post in position.

* * * * *